United States Patent
Truong et al.

(10) Patent No.: US 9,077,451 B2
(45) Date of Patent: *Jul. 7, 2015

(54) INLINE OPTOELECTRONIC CONVERTER AND ASSOCIATED METHODS

(71) Applicant: The Boeing Company, Chicago, IL (US)

(72) Inventors: Tuong K. Truong, Redmond, WA (US); Michael K. La, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 295 days.

This patent is subject to a terminal disclaimer.

(21) Appl. No.: 13/679,135

(22) Filed: Nov. 16, 2012

(65) Prior Publication Data

US 2014/0140702 A1    May 22, 2014

Related U.S. Application Data

(62) Division of application No. 12/356,400, filed on Jan. 20, 2009, now Pat. No. 8,320,766.

(51) Int. Cl.
  *H04B 10/00* (2013.01)
  *G02B 6/36* (2006.01)
  *H04B 10/40* (2013.01)

(52) U.S. Cl.
  CPC ...................... *H04B 10/40* (2013.01)

(58) Field of Classification Search
  USPC ............ 398/115, 116, 117, 135, 139; 385/88, 385/92
  See application file for complete search history.

(56) References Cited

U.S. PATENT DOCUMENTS

| | | | |
|---|---|---|---|
| 4,161,650 A | 7/1979 | Caouette et al. | |
| 5,136,841 A | 8/1992 | Zimmerman | |
| 7,359,592 B2 | 4/2008 | Truong et al. | |
| 8,045,858 B2 | 10/2011 | Truong | |
| 8,320,766 B2 * | 11/2012 | Truong et al. | 398/115 |
| 2010/0183314 A1 | 7/2010 | Truong et al. | |

FOREIGN PATENT DOCUMENTS

| | | |
|---|---|---|
| GB | 2161665 A | 1/1986 |
| WO | WO2010085392 A1 | 7/2010 |

OTHER PUBLICATIONS

International Search Report and Written Opinion of the International Searching Authority, dated May 12, 2010, regarding Application No. PCT/US2010/020772, 9 pages.

(Continued)

*Primary Examiner* — Jack Dinh
(74) *Attorney, Agent, or Firm* — Yee & Associates, P.C.

(57) ABSTRACT

An inline optoelectronic converter configured to convert electrical signals to optical signals and to convert optical signals to electrical signals. The converter is external to the avionic computer and connected to the avionic computer at a location spaced apart from the avionic computer. The converter is configured to be integrated into an existing wiring bundle of the avionic computer. Also disclosed is a method of retrofitting an avionic computer by connecting an optoelectronic converter to the computer. The method comprises connecting the converter to an existing wiring bundle of the avionic computer at a location spaced apart from the avionic computer.

10 Claims, 5 Drawing Sheets

(56) References Cited

OTHER PUBLICATIONS

"Finisar Introduces 40 Gbps Parallel Active Optical Cable," Fiber Optics Online, Nov. 18, 2008, 1 page. http://http://www.fiberopticsonline.com/doc.mvc/Finisar-Introduces-40-Gbps-Parallel-Active-0001.

"Media Converter for Bus Systems," Harting Technology Group, published prior to Jan. 20, 2008, pp. 8-22. http://ilme.cn/product/harting/guanqian/gq-3.pdf.

"MicroFX from Souriau offers a dependable, high speed data transmission solution," Souriau Connection Technology Industrial Product News, published prior to Jan. 20, 2008, 1 page. http://www.heilind.com/products/sauriau/souriau-microfx.pdf.

"Overview for PARALIGHT Active Optical Cable Assemblies," Tyco Electronics Corporation, copyright 2009, 1 page. http://catalog.tycoelectronics.com/catalog/minf/en/582?MRID=47547&BML=10576,17560,17553,17676.

"Protokraft Lightning Mil-Dtl-38999 Fiber Optic Transceivers," Protokraft, LLC., copyright 2006, 3 pages. http://www.Protokraft.com/joomla/index.php?option=com_content&task=view&id=40&Itemid=53.

"Protokraft Mercury Fiber Optic Ethernet Media Converters," Protokraft, LLC., copyright 2006, 3 pages. http://www.protokraft.com/joomla/index.php?option=com_content&task=view&id=45&Itemid=57.

Notice of Allowance, dated Jul. 26, 2012, regarding U.S. Appl. No. 12/356,400, 12 12 pages.

\* cited by examiner

INLINE OPTOELECTRONIC CONVERTER AND ASSOCIATED METHODS

This application is a divisional of application Ser. No. 12/356,400, filed Jan. 20, 2009, status allowed.

TECHNICAL FIELD

The present disclosure relates to an optoelectronic converter. In certain embodiments, the optoelectronic converter is configured for use with an avionic computer and associated wiring aircraft installations.

BACKGROUND

In modern aircraft, avionic computers (also known as line replaceable units (LRUs)) typically include an optical transceiver to enable optical fiber communication with other LRUs. An optical connector on a housing of the computer enables an optical fiber cable to be connected to the computer. Older aircraft, however, typically do not include optical transceivers. These aircraft rely on electrical wiring for the transfer of data between LRUs. Optical fiber cable, however, has certain advantages over electrical wiring. For example, optical fiber cable can mitigate electromagnetic interference and reduce wiring weight. Thus, it is advantageous to retrofit airplanes to provide an optical transceiver for the avionic computer. However, retrofitting that involves placing the optical transceiver inside the avionic computer is in many cases cost prohibitive due to the high cost of redesign and recertification of the avionic computer.

Many solutions exist for adding an optoelectronic converter outside of an LRU. These solutions may include 1) incorporating the converter inside the LRU/aircraft mating connector, on the LRU connector side; 2) incorporating the converter inside the LRU/aircraft mating connector, on the aircraft connector side; 3) incorporating the converter on the stanchion disconnect (LRU equipment bay back wall); and 4) incorporating the converter inside the wire integration panel (WIP).

SUMMARY

The embodiments of the present inline optoelectronic converter and associated methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide advantages. These advantages include the ability to retrofit existing avionic computers without the need to provide a separate DC-to-DC power converter, without the need to modify any onboard circuitry of the avionic computer, and without the need to modify any connector pin configuration of the avionic computer.

One aspect of the present optoelectronic converter and associated methods includes the realization that existing solutions for retrofitting an LRU by adding an optoelectronic converter have drawbacks. For example, with reference to the solutions discussed in the previous section, solution 1) requires changes to the LRU interface circuitry and pin configuration. Any changes made to the LRU require that the LRU be recertified before it can be put back into service. This process is time consuming and expensive. Further, legacy LRUs are sometimes required to remain unmodified so that they can be sold economically as a common standard design to different aircraft platforms. Solution 2) requires the aircraft to provide a DC-DC converter for each optoelectronic converter and long power wires that suffer voltage drops due to low 5 VDC or less requirement. Solution 3) also requires the aircraft to provide a dedicated power supply for the converter. Further, remotely located LRU's don't have a stanchion disconnect panel, and therefore there is no place to mount the converter and power supply. Solution 4) requires long electrical wiring from the LRU to the WIP, which is susceptible to high intensity radio frequency interference and lightning interference and, therefore, defeats the purpose of converting to optical fiber.

One embodiment of the present inline optoelectronic converter is configured to convert electrical signals to optical signals and to convert optical signals to electrical signals. The converter comprises electrical wiring extending between the converter and an avionic computer or between the converter and a connector associated with the avionic computer. The converter further comprises an optical transceiver, a voltage regulator, an electrostatic and electromagnetic interference filter, an optical fiber cable, and an optical fiber terminal. The converter is external to the avionic computer and the wiring operatively connects the converter to the avionic computer at a location spaced apart from the avionic computer. The optoelectronic converter is configured to be integrated into a wiring bundle connected to the avionic computer or the connector. A single power source provides power to both the avionic computer and the optoelectronic converter.

One embodiment of the present methods comprises a method of retrofitting an avionic computer by connecting an optoelectronic converter to the computer. The optoelectronic converter is configured to convert electrical signals to optical signals and to convert optical signals to electrical signals. The method comprises connecting converter power wiring from the optoelectronic converter to existing power wiring from the avionic computer by splicing the converter power wiring into the existing power wiring, or by double staking the converter power wiring with the existing power wiring. The method further comprises cutting existing data wiring from the avionic computer and connecting the existing data wiring to the optoelectronic converter. The method further comprises securing the optoelectronic converter to an existing wiring bundle of the avionic computer at a location spaced apart from the avionic computer.

One embodiment of the present hybrid electrical/optical aircraft data network comprises a first avionic computer and a second avionic computer. The hybrid data network further comprises a first optoelectronic converter associated with the first avionic computer and spaced apart from the first avionic computer. The hybrid data network further comprises a second optoelectronic converter associated with the second avionic computer and spaced apart from the second avionic computer. The hybrid data network further comprises first electrical wiring connecting the first avionic computer with the first optoelectronic converter. The hybrid data network further comprises second electrical wiring connecting the second avionic computer with the second optoelectronic converter. The hybrid data network further comprises an optical fiber cable connecting the first optoelectronic converter with the second optoelectronic converter. The first optoelectronic converter and the first avionic computer are connected to a first common power source, and the second optoelectronic converter and the second avionic computer are connected to a second common power source.

The features, functions, and advantages of the present embodiments can be achieved independently in various embodiments, or may be combined in yet other embodiments.

BRIEF DESCRIPTION OF THE DRAWINGS

The embodiments of the present optoelectronic converter and associated methods now will be discussed in detail with an emphasis on highlighting the advantageous features. These embodiments depict the novel and non-obvious optoelectronic converter shown in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

Figure 1:
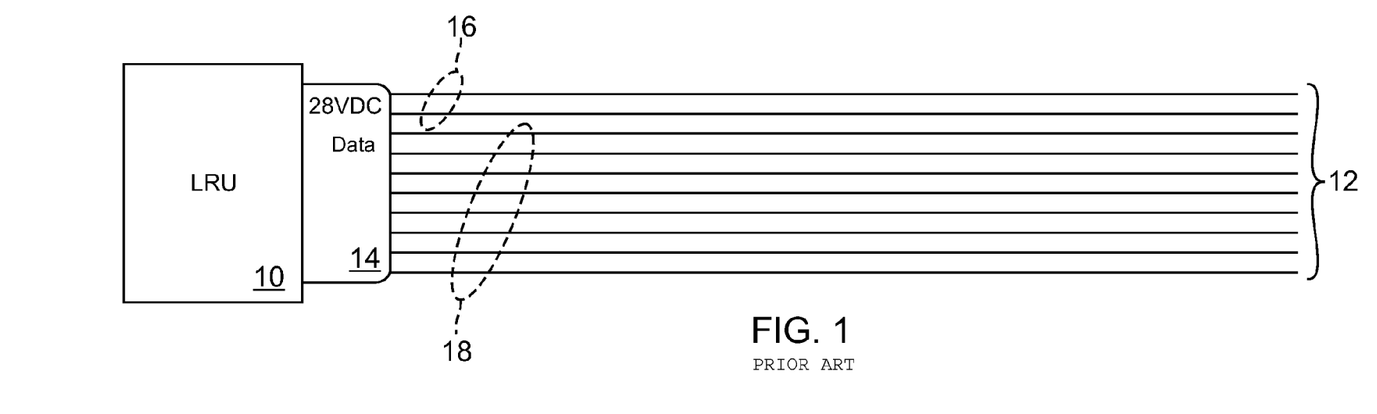
FIG. 1 is a schematic block diagram of a prior art avionic computer.

FIG. 1 illustrates a schematic block diagram of a prior art avionic computer 10. An electrical wiring bundle 12 extends from the computer 10. A connector 14 enables quick connect/disconnect of the wires 12 from the computer 10. The wires 12 are divided into electric power carrying wires 16 and data signal carrying wires 18. The power wires 16 carry electric power from an external source (not shown) to the computer 10. The data wires 18 carry data signals between the computer 10 and various other computers throughout the aircraft (not shown). As used herein, the term data wire is to be construed broadly to include any medium capable of transmitting data, such as data buses and wires capable of carrying analog signals, discrete signals, and digital signals.

Many existing aircraft include an avionic computer 10 of the type illustrated in FIG. 1. It is advantageous to retrofit these computers to add an optoelectronic converter so that the computer 10 can communicate with another computer onboard the aircraft over an optical fiber cable. For example, optical fiber cable can mitigate electromagnetic interference and reduce wiring weight. However, existing retrofitting methods require modification of the computer 10, such as changes to the computer's onboard circuitry and connector pin configuration. Redesign and recertification of an avionic computer is a time consuming and expensive process. The present embodiments provide an optoelectronic converter that can be integrated into the aircraft wiring bundle so that no changes to the computer 10 are necessary.

Figure 2:
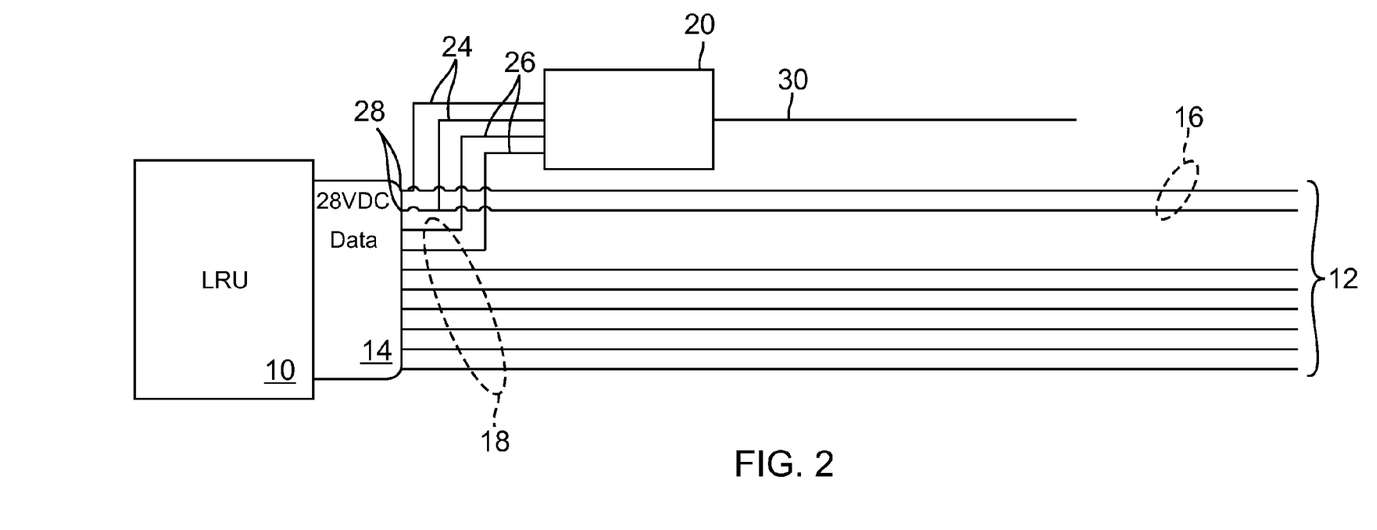
FIG. 2 is a schematic block diagram of one embodiment of the present optoelectronic converter connected to an avionic computer.
Figure 3:
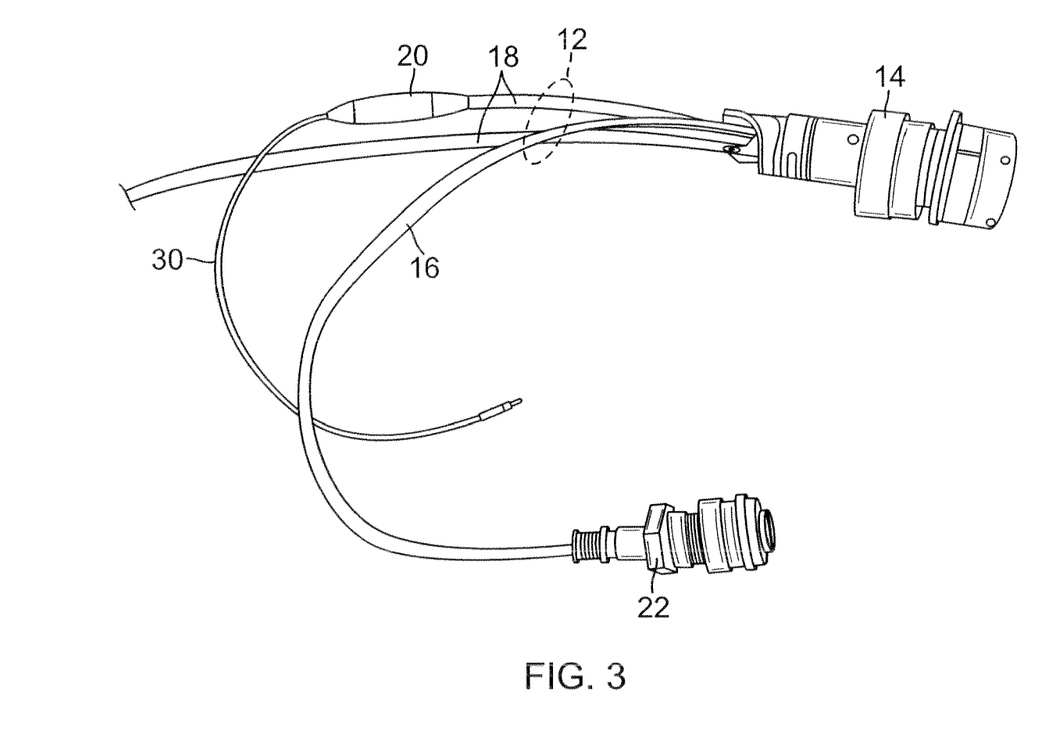
FIG. 3 is a plan view of one embodiment of the present optoelectronic converter connected to electrical wiring and connectors.

FIG. 2 is a schematic block diagram of one embodiment of the present optoelectronic converter 20 integrated into the wiring bundle 12 of an avionic computer 10. FIG. 3 is a plan view of the converter 20 integrated into the wiring bundle 12.

In FIGS. 2 and 3, components that are identical to those of FIG. 1 include like numbering. Thus, as described above, the illustrated assembly includes an avionic computer 10 (FIG. 2) and a connector 14 (FIGS. 2 and 3) that enables quick connect/disconnect of the wires 12 from the computer 10. FIG. 3 also illustrates a connector 22 configured to connect the power wiring 16 to a power source (not shown).

With reference to FIGS. 2 and 3, the converter 20 is a self-contained capsule that is spaced apart from the computer 10, and that connects directly to the existing electrical wiring bundle 12. As shown in FIG. 2, power wires 24 associated with the converter 20 may be spliced into corresponding power wires 16 associated with the computer 10. Rather than splicing, the power wires 24 associated with the converter 20 could be double-staked with the power wires 16 at the terminals 28 on the connector 14. Data wires 26 extend between the terminals 28 on the connector 14 and converter 20. As indicated, the data wires 26 are members of the group of existing wires 18 associated with the LRU 10 prior to the installation of the converter 20.

With continued reference to FIGS. 2 and 3, the converter power wires 24 connect to the computer power wires 16 to tap into the electrical power carried therein and supply power the converter 20. The converter data wires 26 carry electrical data signals between the computer 10 and the converter 20. The converter 20 converts these electrical data signals into optical data signals that are then transmitted to another computer onboard the aircraft (not shown) over an optical fiber cable 30. The remaining computer data wires 18 not connected to the converter 20 may continue to function as they had prior to the installation of the converter 20. For example, these wires may carry electrical signals, such as discrete analog signals, to other avionic computers (not shown). Alternatively, these wires may be used to install additional optoelectronic converters similar to the converter 20.

As indicated, the LRU 10 communicates with other LRUs (not shown) aboard an aircraft. Thus, in one embodiment FIG. 2 illustrates one half of a hybrid electrical/optical aircraft data network. The other half of the hybrid data network comprises a mirror image of FIG. 2. The illustrated LRU 10 communicates with the LRU at the opposite end of the system through the data wires 26, the converter 20 and the optical fiber 30. A second converter 20 at the opposite end of the system receives signals transmitted over the optical fiber 30, converts those optical signals to electrical signals, and transmits those electrical signals to the second LRU over data wires.

Figure 4:
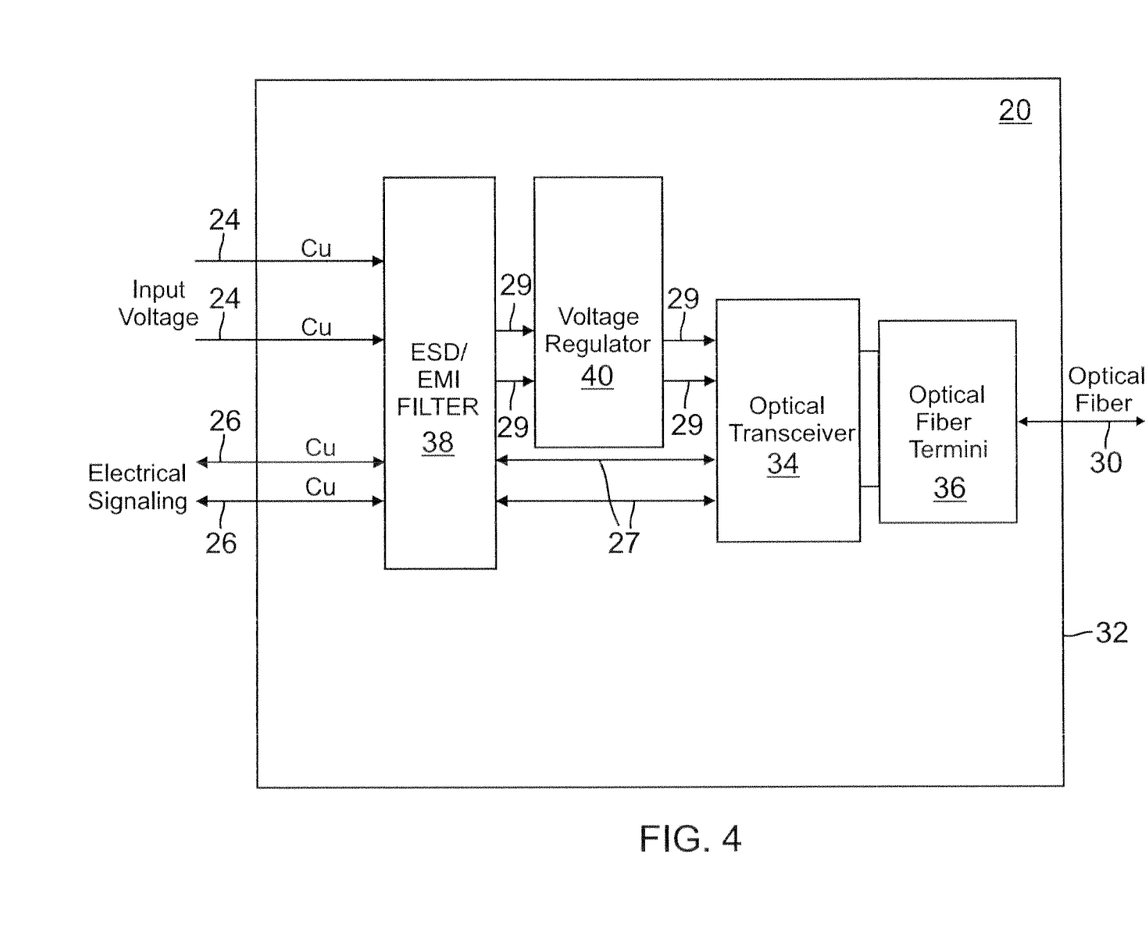
FIGS. 4 and 5 are schematic block diagrams of alternative embodiments of he present optoelectronic converter.

FIG. 4 illustrates a schematic block diagram of a first configuration for the optoelectronic converter 20. A capsule or housing 32 contains the components of the converter 20. In certain embodiments, the capsule 32 may be constructed of metal and hermetically sealed to protect sensitive components inside, such as photonics, from radiated electromagnetic interference, dust, moisture, etc., which are typically present in an aircraft environment.

With continued reference to FIG. 4, an optical transceiver 34 within the capsule 32 is configured to convert electrical signals from the avionic computer 10 to optical signals using a light source and driver (not shown). The optical transceiver 34 is further configured to receive optical signals using a light detector and amplifier (not shown), and to convert those signals to electrical signals for input into the avionic computer 10. The optical transceiver may use two optical fibers for transmit and receive separately, or employ a multiplexer/demultiplexer (not shown) to combine the optical input and output signals onto a single optical fiber.

Depending upon the light source selected, the optical fiber may be glass or plastic, and single mode or multimode. The optical fiber cable 30 connects to an optical fiber terminal 36, which in turn connects to the optical transceiver 34. Because the optical fiber terminal 36 is contained within the capsule 32, it is advantageously protected from dust contamination. The optical fiber cable 30 carries data signals between the avionic computer 10 and another computer onboard the aircraft. In certain embodiments, the optical fiber cable 30 may be a single bidirectional fiber, which advantageously reduces by half the needed amount of fibers and mating connectors, which in turn reduces weight, cost, volume, and installation labor.

With continued reference to FIG. 4, electrical wiring 24, 26 extends between the converter 20 and the computer 10 (or a connector 14 connected to the computer 10), as described above with respect to FIG. 2. The wires 24, 26 connect to an electrostatic and electromagnetic interference filter 38 configured to reduce electrical noise within the converter 20. Additional data wires 27 connect the filter 38 with the optical transceiver 34. The data wires 26, 27 may comprise transmit data, receive data, transmit enable, as well as other control and alarm signals. Additional power wires 29 connect the filter 38 with the optical transceiver 34 through a voltage regulator 40, which converts the existing power supplied to the computer 10 to a suitable voltage for powering the converter 20. In one embodiment, for example, the voltage regulator 40 may receive an input of 0-40 VDC and produce an output of 5 VDC±2 VDC. In another embodiment, the voltage regulator may receive an input of 28 VDC and produce an output of 3 VDC. Those of ordinary skill in the art will appreciate that other voltages could be provided, and the current could be alternating rather than direct.

Figure 5:
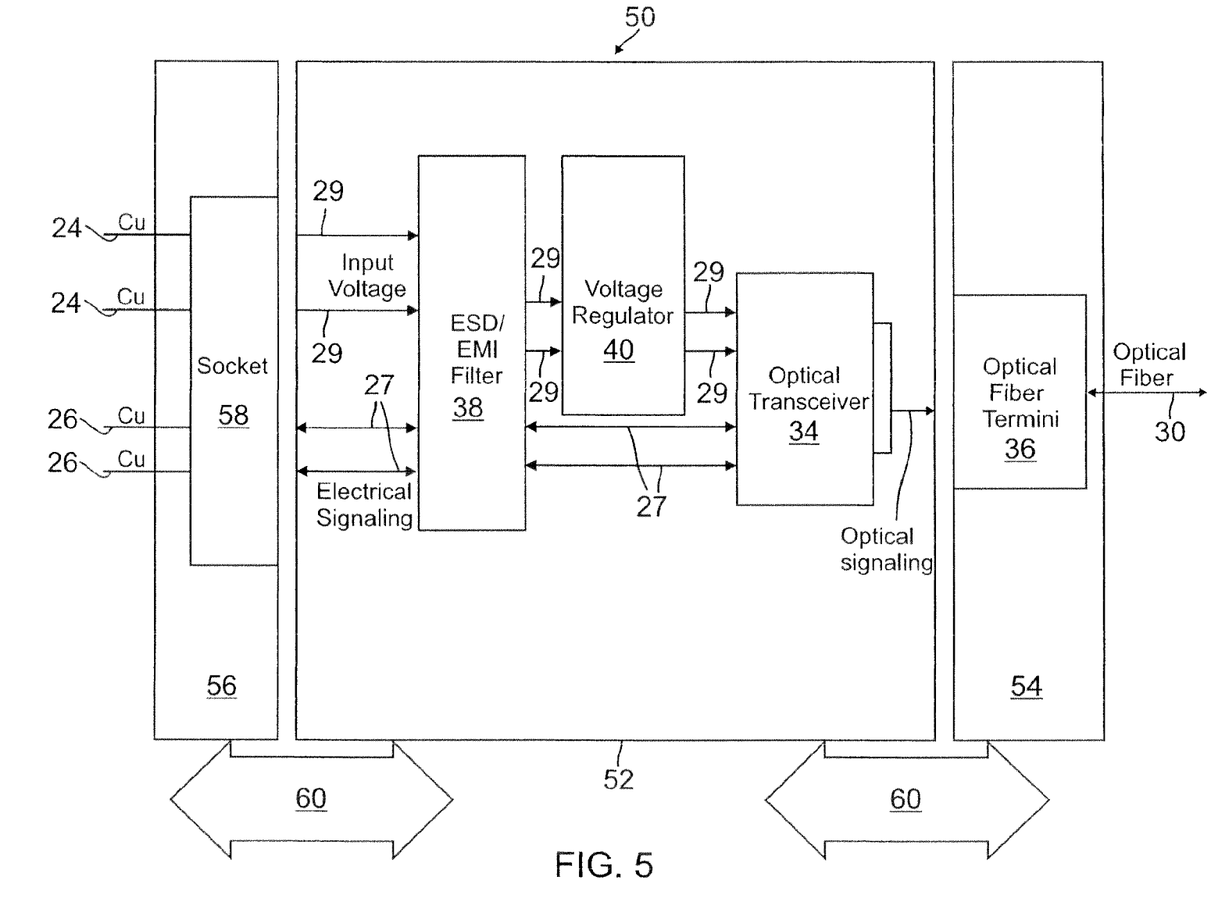

FIG. 5 illustrates a schematic block diagram of another configuration for the optoelectronic converter 50. Comparing FIGS. 4 and 5, in the embodiment of FIG. 4 all components of the converter 20 are contained within the capsule 32, save for the wiring 24, 26 and cabling 30 extending outward from the capsule 32. In the converter 50 of FIG. 5, by contrast, the filter 38, voltage regulator 40 and optical transceiver 34 are contained within the capsule 52, but the optical fiber terminal 36 is not. Instead, the optical fiber terminal 36 is supported within a first connector 54 that is pluggable with the capsule 52. Similarly, the wiring 24, 26 is pluggable with the capsule 52 through a second connector 56 including a socket 58. Within the capsule 52, data wiring 27 and power wiring 29 interconnect the socket 58, ESD/EMI filter 38, voltage regulator 40, and optical transceiver 34 as shown.

The converter 50 of FIG. 5 can be advantageously quickly connected and disconnected from the wiring 24, 26 and the optical fiber cable 30 so that the converter 50 can be quickly replaced in the event it malfunctions. Rather than intruding upon the wiring 24, 26 and the fiber optic cable 30 to perform the more time consuming steps of splicing or staking of wires and cables, the converter 50 can just be unplugged and replaced with a new converter 50 that can also be quickly plugged in. The couplings 60 between the capsule 52 and the connectors 54, 56 can, for example, be bayonet couplings or threaded couplings.

At least two additional configurations are possible for the present optoelectronic converter 20, 50. In one additional configuration (not shown) the converter 50 of FIG. 5 is modified so that the connector 54 on the optical side is replaced with the optical side configuration of the converter 20 of FIG. 4. In another additional configuration (not shown) the converter 50 of FIG. 5 is modified so that the connector 56 on the electrical side is replaced with the electrical side configuration of the converter 20 of FIG. 4.

In certain embodiments, the present optoelectronic converter may be used with an LRU that contains more than one data bus. In such embodiments, multiple data buses may be aggregated with a single optoelectronic converter. However, each data bus would have its own optical converter and would operate on its own unique wavelength. These different wavelengths could then be readily multiplexed on a single bidirectional fiber, or on separate transmit and receive fibers.

As described, the present optoelectronic converter provides conversion of electrical data wiring to a single optical fiber cable for existing LRU's by integrating the capsule into the existing aircraft wiring bundle. The capsule is compact enough that it can be integrated without the need for any mounting hardware to hold the capsule in place. For example, the capsule can be secured to the wiring bundle itself, such as with zip ties or other similar fasteners. Its connection to the wiring provides all the support that is necessary for the capsule. And, the capsule is self-contained. It includes all of the hardware it needs to allow it to be seamlessly integrated into the existing wiring bundle. To reduce part count the capsule can be provided with a pigtail of four wires and an optical fiber cable. Accordingly, the optoelectronic converter avoids the drawbacks of current apparatus and methods that require the provision of additional infrastructure to accommodate the converter, such as a low voltage DC-DC converter, an adapter connector between the LRU connector and the converter connector, mounting for the converter etc. Further, the capsule integrates into the wiring bundle at a location spaced from the LRU. Accordingly, the optoelectronic converter avoids the drawbacks of current apparatus and methods that require changes to the LRU, such as an adapter connector between the LRU connector and the converter connector, changes to onboard circuitry of the computer, changes to the connector pin configuration of the computer, etc.

Figure 6:
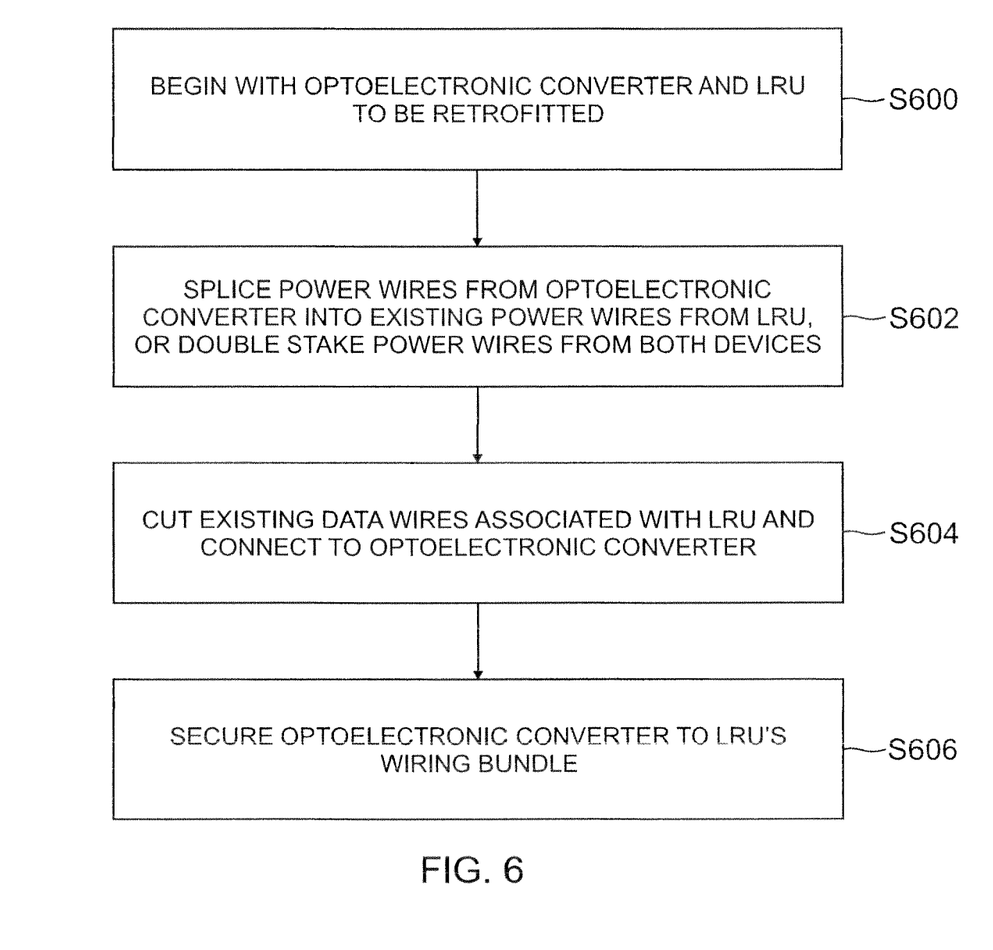
FIG. 6 is a flowchart illustrating the steps in one embodiment of the current methods associated with an inline optoelectronic converter.

FIG. 6 illustrates one embodiment of a method for retrofitting an LRU with the present optoelectronic converter. In step S600 the operator begins with the optoelectronic converter and the LRU that is to be retrofitted. In step S602 the operator splices the power wires from the optoelectronic converter into the existing power wires from the LRU. Alternatively, the operator may double stake the power wires from both devices at the LRU or at the connector connected with the LRU. In step S604 the operator cuts the existing data wires associated with LRU and connects the cut wires to the optoelectronic converter. Alternatively, the optoelectronic converter may be supplied with its own data wires, which could be spliced with the LRU's existing data wires or staked at the LRU or at the connector connected with the LRU. In step S606 the operator secures the optoelectronic converter to LRU's wiring bundle, as with zip ties or the like.

The above description presents the preferred mode contemplated for carrying out the present optoelectronic converter and associated methods, and of the manner and process of making and using it, in such full, clear, concise, and exact terms as to enable any person skilled in the art to which it pertains to make and use this optoelectronic converter and these methods. This optoelectronic converter and these methods may, however, be modified or constructed differently from that discussed above. These modifications and alternate constructions are, however, fully equivalent. Consequently, this optoelectronic converter and these methods are not limited to the particular embodiments disclosed. On the contrary, this optoelectronic converter and these methods cover all modifications and alternate constructions coming within the spirit and scope of the embodiments as generally expressed by the following claims, which particularly point out and distinctly claim the subject matter of the present embodiments.

What is claimed is:

1. An optoelectronic converter comprising:
   electrical wiring extending between the converter and an avionic computer;
   an optical transceiver;
   a voltage regulator;
   an electrostatic and electromagnetic interference filter;
   an optical fiber cable; and
   an optical fiber terminal;
   wherein the converter is external to the avionic computer and the wiring operatively connects the converter to the avionic computer at a location spaced apart from the avionic computer;
   further wherein the optoelectronic converter is configured to be integrated into a wiring bundle connected to the avionic computer or the connector; and
   further wherein a single power source provides power to both the avionic computer and the optoelectronic converter.

2. The optoelectronic converter of claim 1, further comprising a housing enclosing at least the optical transceiver, the voltage regulator and the electrostatic and electromagnetic interference filter.

3. The optoelectronic converter of claim 2, wherein the housing also encloses the optical fiber terminal.

4. The optoelectronic converter of claim 2, further comprising a connector configured to enable the optical fiber cable to be plugged into and unplugged from the converter.

5. The optoelectronic converter of claim 4, wherein the optical fiber terminal is a component of the connector, such that when the connector is unplugged from the converter the optical fiber terminal is also unplugged from the converter.

6. The optoelectronic converter of claim 2, further comprising a connector configured to enable the electrical wiring to be plugged into and unplugged from the converter.

7. The optoelectronic converter of claim 6, wherein the connector includes a socket for receiving a mating member of the converter.

8. The optoelectronic converter of claim 2, wherein the housing is hermetically sealed.

9. The optoelectronic converter of claim 2, wherein a first subset of the electrical wiring carries electric power, and a second subset of the electrical wiring carries data signals.

10. The optoelectronic converter of claim 9, wherein the first subset of the electrical wiring provides an input voltage to the voltage regulator.

* * * * *